United States Patent [19]

Mann et al.

[11] 4,214,197
[45] Jul. 22, 1980

[54] BATTERY CHARGER FOR A PORTABLE RADIO

[75] Inventors: Friedrich H. Mann; Paul F. Sensabaugh, both of Lynchburg, Va.

[73] Assignee: General Electric Company, Lynchburg, Va.

[21] Appl. No.: 973,646

[22] Filed: Dec. 26, 1978

[51] Int. Cl.² .................... H01M 10/46; H02J 7/00; H01R 13/54
[52] U.S. Cl. .................................. 320/2; 455/89; 455/349
[58] Field of Search ........................ 320/2-4; 325/16, 356, 361

[56] References Cited

U.S. PATENT DOCUMENTS

| 3,345,568 | 10/1967 | Errichiello et al. | |
| 3,579,075 | 5/1971 | Floyd | 320/2 |
| 3,644,873 | 2/1972 | Dalton et al. | |
| 4,091,318 | 5/1978 | Eichler et al. | 320/2 |
| 4,141,616 | 2/1979 | Gottlieb | 320/2 |

FOREIGN PATENT DOCUMENTS 2702129  7/1978  Fed. Rep. of Germany .............. 320/2

Primary Examiner—Robert J. Hickey
Attorney, Agent, or Firm—James J. Williams

[57] ABSTRACT

A battery charger for a portable radio having a battery pack forming a radio-battery unit and arranged to accommodate various combinations of both radio and battery lengths, the charger being provided with a recess for positioning a radio-battery unit in a selected axial position therein with a plurality of axially spaced sets of charging contacts disposed within the recess, each set being arranged for selective circuit making engagement with charging terminals on the battery pack in accordance with the length of the radio inserted with the charger recess.

14 Claims, 12 Drawing Figures

BATTERY CHARGER FOR A PORTABLE RADIO

BACKGROUND OF THE INVENTION

This invention relates to portable radios and more particularly to a battery charger for a portable radio having a battery pack.

Portable radios of the type used for two-way communication are in common use today and are generally provided with a battery pack or compartment forming an integral unit to eliminate the need for power conductors for connection to an external source of power. Such present day battery packs permit the operation of the radio for a limited period of time at the desired power level following which the power output of the battery is weakened or reduced limiting the effectiveness of the radio. Therefore, it is a common practice to provide rechargeable batteries for such portable radios so that the radio-battery unit may be placed in a suitable charger connected to a source of power for recharging the battery back to full power.

A wide variety of such radio-battery units are produced today which are characterized mainly by not only radios of different lengths, but also battery packs which vary in capacity and therefore in length. One such radio- battery unit is shown in U.S. Pat. No. 3,644,873. Such variations in these radio-battery units present certain disadvantages when utilized with a charger as it is therefore necessary to provide a charger of a specific construction to fit a radio-battery unit of a specific size. For instance, in such present day chargers, the charging contacts must be located in a fixed position in the charger for each specific combination of radio-battery length or a complex spring loaded arrangement must be provided for the charging contacts on the charger so that the charging contacts may be moved into a selected position with such a contact arrangement keyed to mate with the contact terminals on the battery so as to permit the movement of the charging contacts on the charger in accordance with the length of each radio-battery combination inserted in the charger.

OBJECTS AND SUMMARY OF THE INVENTION

Accordingly, a primary object of this invention is to provide a new and novel battery charger for a portable radio-battery unit.

Another object of this invention is to provide a new and novel battery charger for a portable radio which permits the charging of the radio battery of such units wherein both the radio and battery are of variable lengths.

Still another object of this invention is to provide a new and novel battery charger for a portable radio-battery unit which accommodates such radio-battery units of different radio and battery lengths without any adjustment of the charger parts.

Still another object of this invention is to provide a new and novel battery charger for a portable radio-battery unit which may be used to charge a wide variety combination of radio-battery lengths, which is simple in construction, low in cost, composed of a minimum of parts and which is capable of prolonged use without maintainence or adjustment.

a still further object of this invention is to provide a new and novel combination of a portable radio-battery unit and a battery charger for such a unit wherein a single charger may be used to charge the battery in such units of variable radio and battery lengths.

The objects of this invention and other related objects are accomplished by the provision of a housing having a central recess for slidably accommodating a portable radio of a selected length having a battery pack integral therewith and a plurality of charging terminals on the outer surface of the battery pack. Stop means are provided on the housing which are engageable with a radio inserted in the recess to position the radio in a fixed axial position within the recess and a plurality of sets of charging contacts are arranged in longitudinally spaced relationship on the inner wall of the central recess for circuit making engagement with the charging terminals on the battery pack. The battery pack is also of a selected length with the charging terminals in a predetermined position and one of the sets of charging contacts is arranged for circuit making engagement with the charging terminals on the battery pack of a portable radio of one selected length and the other set of charging contacts is arranged for circuit making engagement with the battery pack charging terminals on a radio of another selected length.

These and other objects and features of the present invention will be apparent from the following detailed description taken with reference to the figures of the accompanying drawings.

DESCRIPTION OF THE PREFERRED EMBODIMENTS

Figure 1:
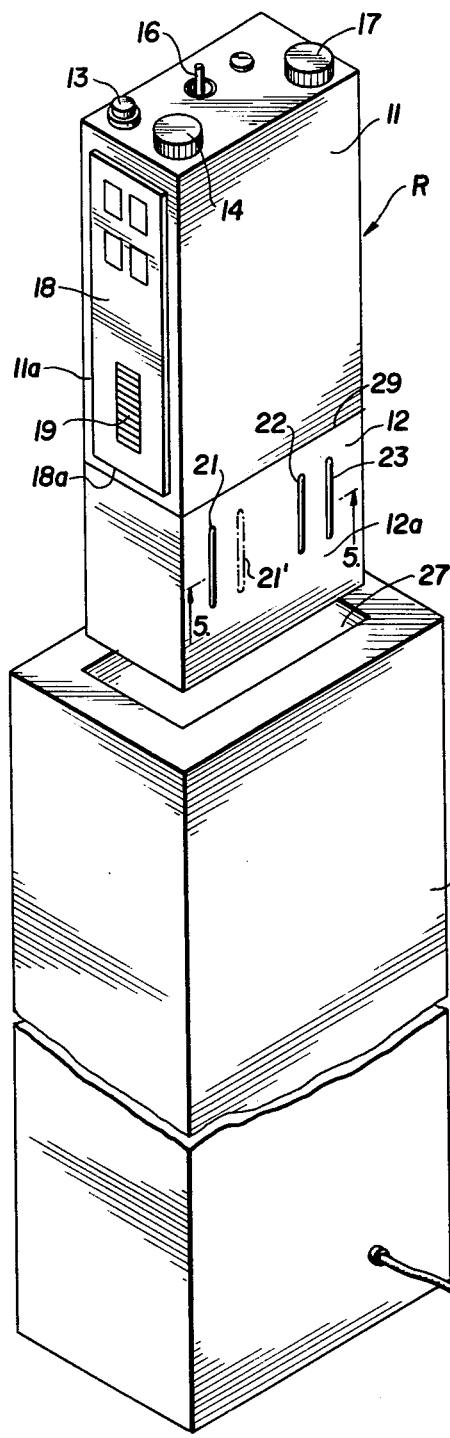
FIG. 1 is a perspective view of a portable radio-battery unit and a battery charger constructed in accordance with the invention.

Referring now to the drawings and to FIG. 1 in particular, there is shown a portable radio-battery unit designated generally by the letter R in association with a battery charger designated generally by the letter V. The unit R of FIG. 1 is of conventional construction (referred hereinafter as an "A" size radio) includes a radio 11 having a battery pack 12 mounted integrally thereon as a unit, both the radio 11 and battery pack 12 being of substantially identical cross sectional shape so that the side walls form a continuous surface throughout the length of the unit R.

The radio 11 includes the conventional control devices such as an antenna 13, squelch control 14, a frequency selection switch 16 and a volume and on-off control knob 17 at the upper end thereof as shown. The side wall 11a of the radio 11 includes a plate 18 in which is disposed a push-to-talk switch 18, as is well known, and the lower edge 18a of the plate 18 forms detent means for locating the radio-battery unit R within the charger V as will be explained hereinafter.

Figure 6:
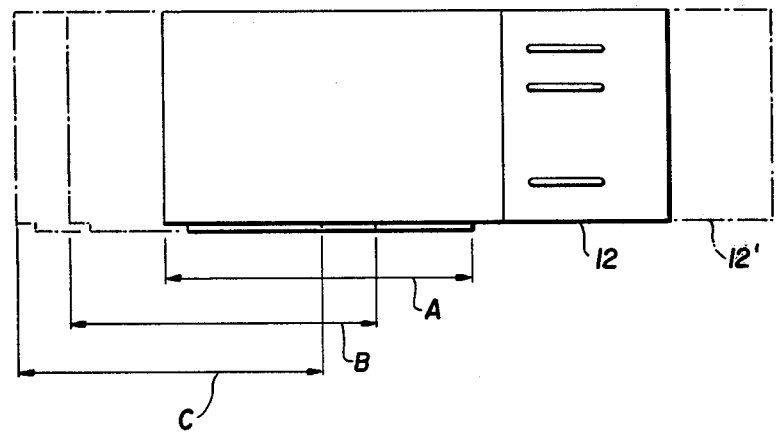
FIG. 6 is a plan view of a portable radio-battery unit illustrating the various lengths of the radio and battery components of such a unit.

The battery compartment 12 is arranged in the well known manner to accommodate a battery (not shown) which is of the rechargeable type. The battery compartment 12 is of a selected length in accordance with the power output capacity and, as shown best in FIGS. 1, 6, the length of the battery compartment 12, as shown in solid lines in FIG. 6 provides for a battery having a capacity of 700 Ma. As shown in broken lines in FIG. 6 and identified by the references 12', a longer battery compartment provides for a capacity of 1200 Ma. Thus, both radio 11 and battery compartment 12 may be of a selected length so as to provide for various combinations of such lengths. As will be further seen from FIG. 6 wherein the battery length "A" as is shown in solid lines, the radio 11 may be of greater lengths as shown in broken lines in FIG. 6 and identified by the letters "B" and "C".

Figure 5:
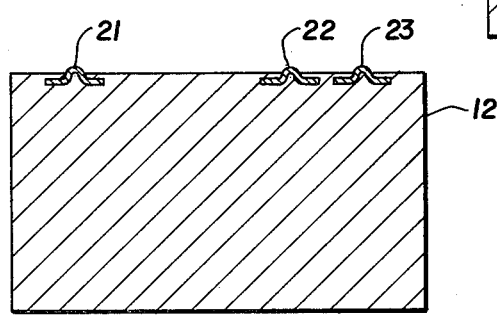
FIG. 5 is a sectional view taken substantially along line 5—5 of FIG. 1.

In order to provide for the charging of the battery in the compartment 12, the outer surface 12a of the battery compartment 12 is provided with a plurality of contact terminals 21, 22, 23 suitably mounted flush with the battery compartment surface 12a (as shown best in FIG. 5) to form charging terminals by means of which charging power is supplied to the rechargable battery in the compartment 12 by the charger V. Suitable connections (not shown) are provided for connecting the terminals 21, 22, 23 to the rechargable battery. In the illustrated embodiment, three of such charging terminals 21-23 are provided. Two of such terminals 23, 23 being disposed in relatively closely spaced, associated relationship and terminal 21 being disposed in greater spaced-apart relationship with the terminals 22, 23. The terminal 21 may be positioned in the solid line position of FIG. 1 or in the broken line position of FIG. 1 as identified by the reference numeral 21'.

Figure 3:
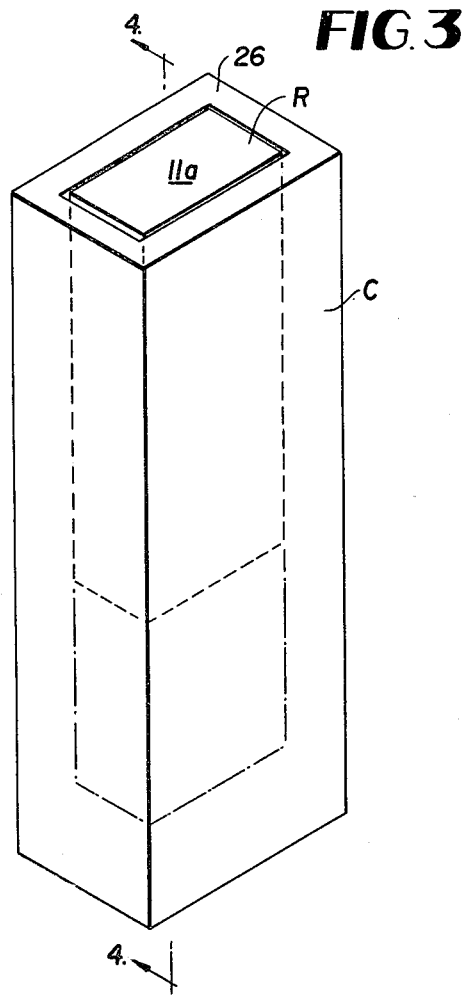
FIG. 3 is a perspective view of the battery charger of FIG. 2 illustrating the radio-battery unit in the charging position.
Figure 4:
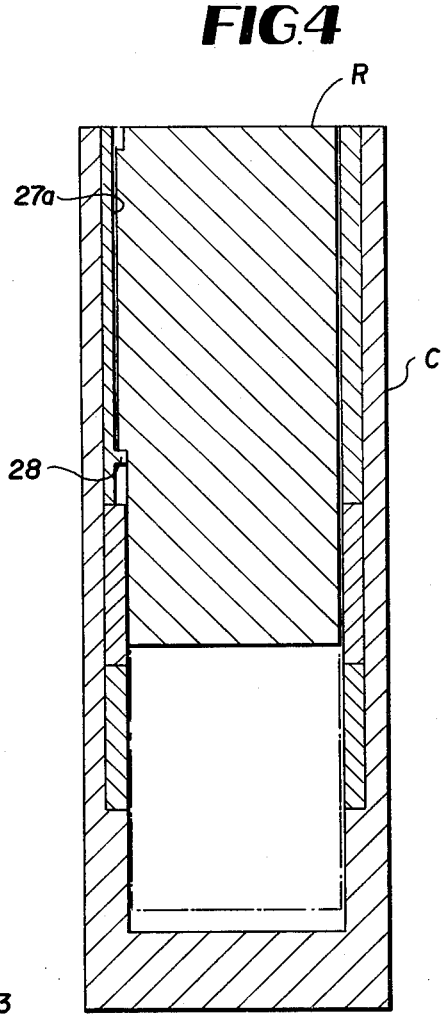
FIG. 4 is a sectional view taken substantially along line 4—4 of FIG. 3 in the direction of the arrows.

In accordance with the novel construction of the battery charger of the invention, the charger V includes a housing 26 which may be formed of metal or the like having a central recess 27 for slidably accommodating the radio-battery unit R, the recess 27 being of rectangular cross-sectional shape for sliding engagement with the side walls of the unit R similarly of rectangular cross-sectional shape. As shown best if FIGS. 3, 4, the unit R is inserted within the recess 27 into a position wherein the upper end 11a of the radio 11 is positioned substantially flush with the upper end 26a of the charger V.

Figure 2:
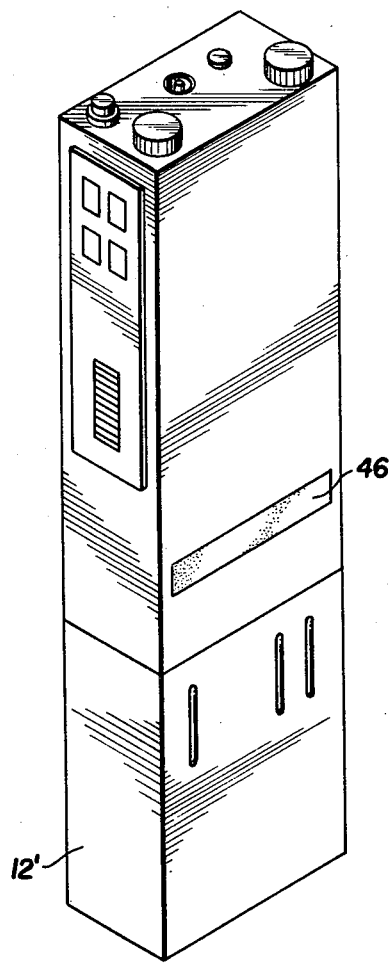
FIG. 2 is a perspective view of a portable radio-battery unit having a radio and battery length different from that of the unit of FIG. 1.

In order to locate the unit R within the central recess 27 of the housing 26 in any combination of radio and battery lengths, stop means are provided on the inner wall of the recess 27. More specifically, the inner wall 27a of the recess 27 is provided with a projection 28 suitably located, as shown best in FIG. 4, for engagement with the detent means or edge 18a of the plate 18 in the inserted position of the unit R. Thus, as the position of the plate 18 is common to all radio lengths (A, B and C) and engagement between the edges 18a and projection 28 locates all units R in the same position in the charger V with the battery pack or compartment 12 or 12' extending downwardly towards the bottom of the recess 27 in the case of either length of battery compartment 12 or 12'. It will also be noted in FIGS. 1, 2 and 6 that the charging terminals 21-23 on the battery compartment 12 are located in the same axial position relative to the intersection 29 between the battery compartment 12 and radio 11 for either length of battery compartment as identified by the numerals 12 or 12'.

Figure 7:
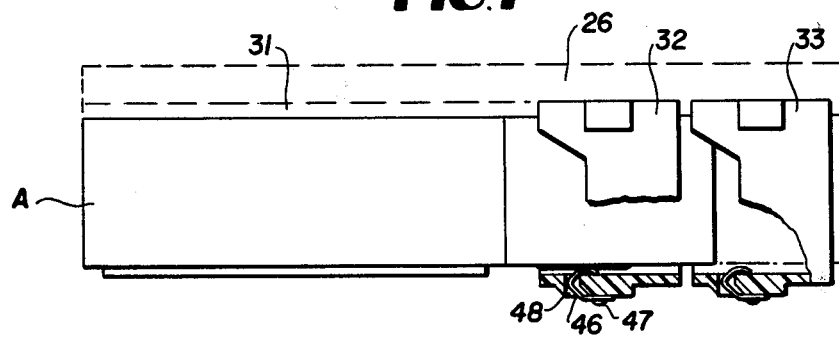
FIG. 7 is a side view, partially in section and partially broken away illustrating a radio-battery unit of one selected length in the association with a portion of the battery charger of the invention.

In order to apply charging power to the battery within the compartment 12 or 12', the central recess 27 in the charger housing 26 is provided with an inner sleeve member 31 extending downwardly from the upper end 26a of the housing 26 as shown best in FIG. 7. The sleeve 31 being preferably composed of an insulating plastic material. Within the lower part of the central recess 27 adjacent the plastic sleeve 31 are a pair of sleeves 32, 33 of rectangular cross-sectional shape each defining a central bore for accommodating the lower portion of the radio-battery unit R or more specifically the battery compartments 12 or 12'. The sleeves 32, 33 are also preferably of plastic material for insulating purposes.

The sleeves 32, 33 are provided with a plurality of charging contacts for circuit making engagement with the charging terminals 21-23 on the battery packs or compartments 12 or 12', the sets of charging contacts being arranged in longitudinally spaced relationship for supplying battery power to the rechargable battery in the compartments 12, 12'. It should be understood that the charger V is arranged to be connected to any suitable source of power by conventional means such as power cord 34 extending from the charger V as shown in FIG. 1. More specifically, sleeve 32 is provided with two pairs of charging contacts 36, 37 and 38, 39 arranged in laterially spaced relationship as shown best in FIG. 8. Similarly, sleeve 33 is provided with two pairs of charging contacts 41, 42, 43, 44 also similarly arranged in laterally spaced relationship identical to the arrangement of contacts 36-39 and also of identical construction.

Figure 8:
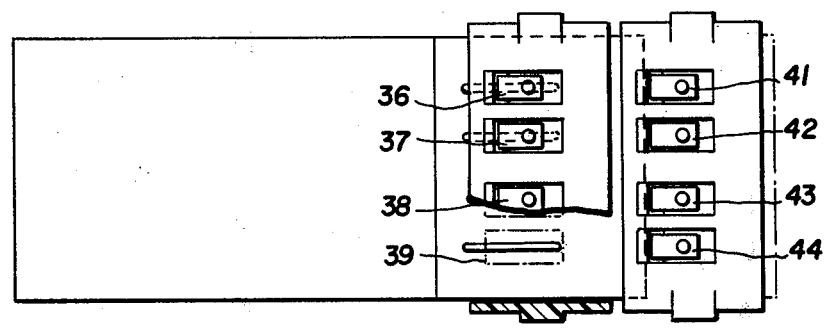
FIG. 8 is another side view of the unit of FIG. 7 also partially in section and partially broken away.
Figure 9:
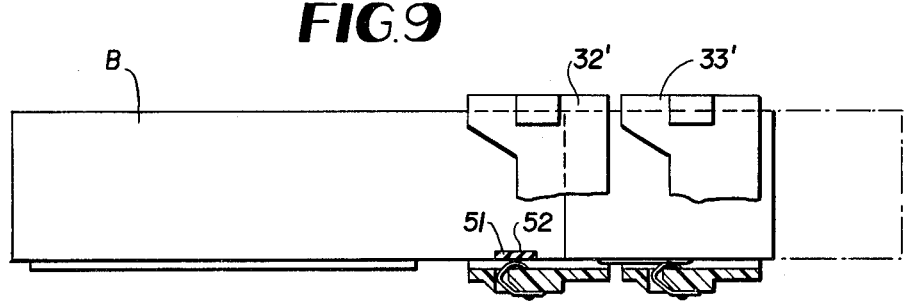
FIG. 9 is a side view similar to FIG. 7 illustrating a radio-battery unit of a different length in association with a portion of the charger of the invention.
Figure 10:
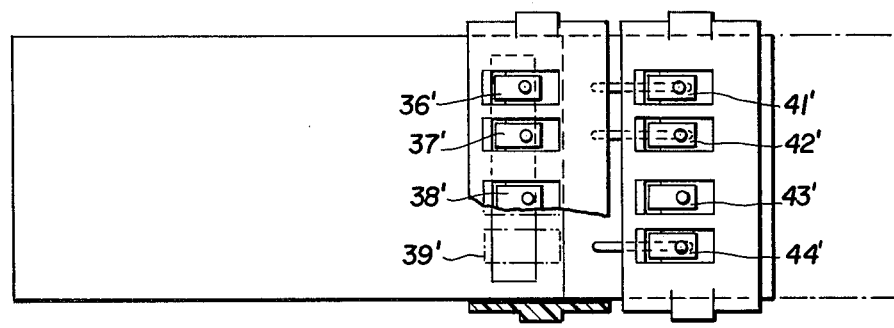
FIG. 10 is a view similar to FIG. 8 of another side of the unit of FIG. 9.
Figure 11:
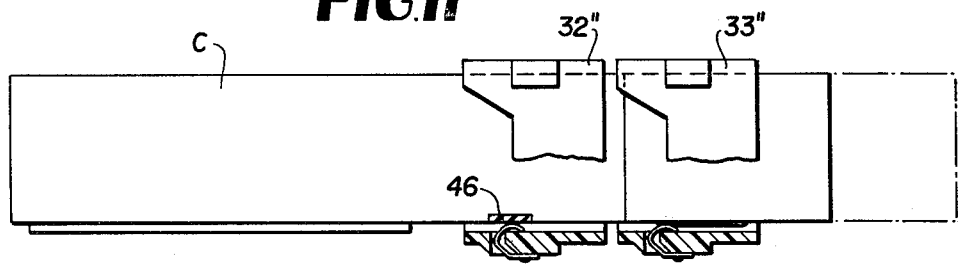
FIG. 11 is a side view similar to FIG. 9 showing a radio-battery unit of still another selected length in association with a portion of the charger of the invention.
Figure 12:
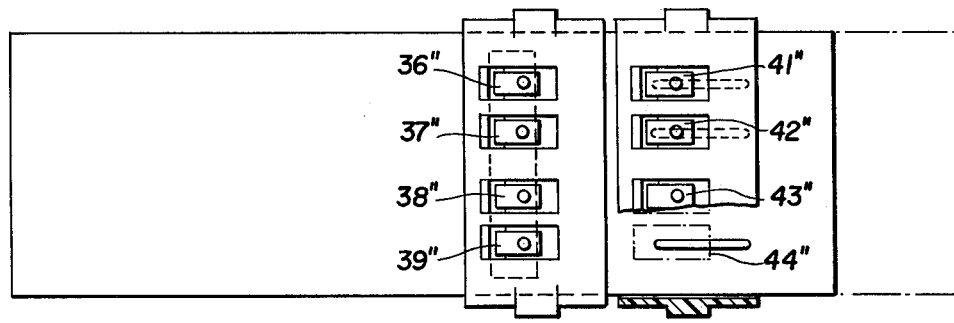
FIG. 12 is a view similar to FIG. 10 of another side of the unit of FIG. 11.

Each of the charging contacts 36-39 and 41-44 include a spring contact 46 secured at one end by means of a screw 47 to outer wall of the sleeve 32 or sleeve 33, the spring contact 46 extending through an aperture 48 in the wall of the sleeves 32, 33 as shown best in FIG. 7. Thus, the inner end of each spring contact 46 extends within the interior of the sleeves 32, 33 for contact making engagement with underlying charging terminals 21-23 on the battery compartment 12 (12') of the inserted unit R. As best shown in FIG. 8, charging contacts 36, 37 are therefore arranged to engage charging terminals 22, 23 and charging contact 39 is arranged to engage charging terminal 21. It should be understood that when the charging terminal 21 is disposed in the broken line position 21' shown in FIG. 1, charging contact 38 will engage this charging terminal 21' instead of charging contact 39.

As the charging contacts 36-39 are not utilized for charging the batteries whose associated radios have lengths B and C, it is necessary to insulate these charging contacts from the outer wall of the radio 11. Accordingly, a laterally extending strip of insulating material such as plastic or the like which is disposed within a corresponding recess 52 in the outer wall of the radio 11 having lengths B or C. Thus, the spring contact 46 engages the plastic strip 51, as shown in FIGS. 9-12, to insulate the spring contact 46 of charging contacts 36-39 on units R having radio lengths B and C.

What is claimed and desired to be secured by Letters Patent of the United States is:

1. A battery charger for portable radios of variable lengths having a battery pack and a plurality of charging terminals on the outer surface of said battery pack comprising, in combination, a housing having a central recess for slidably accommodating a portable radio, stop means on said housing engagable with a radio inserted in said recess for positioning said portable radio at a fixed axial position within said recess, a plurality of sets of charging contacts arranged in axially spaced relationship on the inner wall of said central recess for circuit making engagement with said charging terminals on said battery pack, one of said sets of charging contacts being arranged for circuit making engagement with the charging terminals on the battery pack of a portable radio of one selected length and another set of charging contacts being arranged for said circuit making engagement with the charging terminals on the battery pack on the radio of another selected length.

2. A battery charger in accordance with claim 1 including means disposed within said central recess for supporting said plurality of sets of charging contacts.

3. A battery charger in accordance with claim 2 wherein said means for supporting said plurality of sets of charging contacts comprise a sleeve for supporting each of said sets of charging contacts.

4. A battery charger in accordance with claim 2 or claim 3 wherein each of said sets of charging contacts include a plurality of contact elements disposed in laterally spaced relationship on said supporting means for circuit making engagement with one of said contact terminals on said battery pack.

5. A battery charger in accordance with claim 4 wherein each of said charging contacts include a spring contact having an inner end portion for said circuit making engagement with one of said contact terminals.

6. A battery charger in accordance with claim 4 wherein each of said sets of charging contacts includes an associated pair of laterally spaced contact elements for circuit making engagement with a correspondingly spaced pair of charging terminals on said battery pack and at least one contact element in laterally spaced relationship with said pair of contact elements for circuit making engagement with a contact terminal on said battery pack.

7. A portable radio having a battery pack and a battery charger for said radio comprising in combination, a portable radio having a selected length, a battery pack of a selected length fixed to one end of said radio, detent means on the outer surface of said radio, a plurality of charging terminals on the outer surface of said battery pack, a housing having a central recess for slidably accommodating said radio, stop means on said housing for engagement with said detent means for locating said radio in a fixed axial position within said recess, a plurality of sets of charging contacts on the inner wall of said central recess for circuit making engagement with said charging terminals on said battery pack, one of said plurality of sets of charging contacts being arranged for circuit making engagement with the charging terminals on the battery pack of a portable radio of one selected length and another set of charging contacts being arranged for circuit making engagement with the battery pack charging terminals on the radio of another selected length.

8. A portable radio in accordance with claim 7 wherein said detent means comprise a projection on the outer surface of said radio.

9. A portable radio in accordance with claim 7 or claim 8 wherein said stop means comprises a projection on the inner wall of said central recess.

10. A portable radio in accordance with claim 7 or claim 8 including a strip of insulating material on the outer surface of said radio for engagement with one of said sets of charging contacts in the circuit making position of another set of charging contacts with said charging terminals.

11. A portable radio in accordance with claim 9 including a strip of insulating material on the outer surface of said radio for engagement with one of said sets of charging contacts in the circuit making position of another set of charging contacts with said charging terminals.

12. A battery charge in accordance with claim 1 or claim 2 or claim 3 wherein each of said charging contacts include a spring contact having an inner end portion for said circuit making engagement with one of said contact terminals.

13. A battery charger in accordance with claim 1 or claim 2 or claim 3 wherein each of said sets of charging contacts includes an associated pair of laterally spaced contact elements for circuit making engagement with a correspondingly spaced pair of charging terminals on said battery pack and at least one contact element in laterally spaced relationship with said pair of contact elements for circuit making engagement with a contact terminal on said battery pack.

14. A battery charger in accordance with claim 5 wherein each of said sets of charging contacts includes an associated pair of laterally spaced contact elements for circuit making engagement with a correspondingly spaced pair of charging terminals on said battery pack and at least one contact element is laterally spaced relationship with said pair of contact elements for circuit making engagement with a contact terminal on said battery pack.

* * * * *